US011726451B2

(12) United States Patent
Hodel et al.

(10) Patent No.: US 11,726,451 B2
(45) Date of Patent: Aug. 15, 2023

(54) REMOTE PROCESSING OF SENSOR DATA FOR MACHINE OPERATION

(71) Applicant: Caterpillar Inc., Peoria, IL (US)

(72) Inventors: Benjamin J. Hodel, Dunlap, IL (US); Matthew James Beschorner, Plainfield, IL (US)

(73) Assignee: Caterpillar Inc., Peoria, IL (US)

( * ) Notice: Subject to any disclaimer, the term of this patent is extended or adjusted under 35 U.S.C. 154(b) by 247 days.

(21) Appl. No.: 17/303,308

(22) Filed: May 26, 2021

(65) Prior Publication Data

US 2022/0382251 A1  Dec. 1, 2022

(51) Int. Cl.
*G05B 19/4155* (2006.01)
*G08C 17/02* (2006.01)

(52) U.S. Cl.
CPC ......... *G05B 19/4155* (2013.01); *G08C 17/02* (2013.01); *G05B 2219/31104* (2013.01)

(58) Field of Classification Search
CPC ...... G05B 19/4155; G05B 2219/31104; G08C 17/02; E02F 9/261; E02F 9/264; E02F 9/205
See application file for complete search history.

(56) References Cited

U.S. PATENT DOCUMENTS

| | | | |
|---|---|---|---|
| 6,856,879 B2 | 2/2005 | Arakawa et al. | |
| 8,818,567 B2 | 8/2014 | Anderson | |
| 9,228,321 B1 * | 1/2016 | Stratton | G05D 1/0022 |
| 10,066,367 B1 | 9/2018 | Wang et al. | |
| 2010/0106299 A1 * | 4/2010 | Nagata | B25J 13/06 700/83 |
| 2017/0103580 A1 | 4/2017 | Petrany et al. | |
| 2020/0392703 A1 | 12/2020 | Sherlock | |

(Continued)

FOREIGN PATENT DOCUMENTS

| | | |
|---|---|---|
| EP | 2966612 A1 | 1/2016 |
| EP | 3228849 A1 | 10/2017 |

(Continued)

OTHER PUBLICATIONS

Written Opinion and International Search Report for Int'l. Patent Appln. No PCT/US2022/028090, dated Sep. 13, 2022 (12 pgs).

(Continued)

*Primary Examiner* — Mohammad Ali
*Assistant Examiner* — Sheela Rao (57) ABSTRACT

A controller may receive, from one or more sensor devices of the work machine, sensor data of an environment that includes a ground surface on which the work machine is located. The controller may determine whether a wireless connection is viable. The controller may selectively transmit the sensor data to one or more remote computing devices for processing or processing the sensor data locally by the work machine based on whether the wireless connection is viable. When the wireless connection is viable, the sensor data is transmitted to the one or more remote computing devices to cause the one or more remote computing devices to process the sensor data to provide first processed data. When the wireless connection is not viable, the sensor data is processed locally by the work machine to generate second processed data.

20 Claims, 3 Drawing Sheets

(56) References Cited

U.S. PATENT DOCUMENTS

2021/0034058 A1  2/2021  Subramanian et al.
2021/0072764 A1  3/2021  Kean

FOREIGN PATENT DOCUMENTS

WO      2019/012988 A1   1/2019
WO       2020196674 A1  10/2020

OTHER PUBLICATIONS

Trevithick, "U-2 Spy Plane Taps Into Computers on the Ground to Expand Data Processing Ability Mid-Mission," The Drive, Dec. 2020, 14 pages [retrieved from https://www.thedrive.com/the-war-zone/38162/u-2-spy-plane-taps-into-computers-on-the-ground-to-help-process-sensor-data-mid-mission on May 19, 2021].
"VIPER's Mission Operations," National Aeronautics and Space Administration, edited by Rick Chen, Feb. 2021, 8 pages [retrieved from https://www.nasa.gov/viper/lunar-operations on Apr. 23, 2021].
Galceran et al., "A Survey on Coverage Path Planning for Robotics," University of Girona—Underwater Robotics Research Center (CIRS), Aug. 2013, 37 pages.

* cited by examiner

FIG. 3

REMOTE PROCESSING OF SENSOR DATA FOR MACHINE OPERATION

TECHNICAL FIELD

The present disclosure relates generally to processing of sensor data of a machine and, for example, to remote processing of sensor data of a machine.

BACKGROUND

A work machine (e.g., an excavator) may include stereoscopic ("stereo") cameras that capture images of an environment surrounding the machine. The images may be processed to generate information that may be used for different operations performed by the work machine. Processing the images (e.g., to generate such information) can be computationally complex and time-consuming.

Processing the images using typical computing resources, of the work machine, consumes an excessive amount of computing resources that may be needed for different operations of the work machine. Accordingly, processing the images using the typical computing resources may negatively impact an ability of the work machine to perform such operations. Moreover, the work machine may be used in rugged and harsh conditions that may subject the typical computing resources to premature failures.

U.S. Pat. No. 6,856,879 (the '879 patent) discloses ensuring that the amount of time a construction machine has been operated by each operator can be managed. The '879 patent further discloses ensuring that an administrator can learn without delay, in real time and accurately, that a service person has performed services on a construction machine. The '879 patent further discloses ensuring that work instructions are imparted to a service person, and service person performance management and labor management are performed easily and accurately. The '879 patent further discloses ensuring that the attachment situation of a construction machine can be learned accurately and in real time such that customer requests can be dealt with promptly. However, the '879 patent does not address problems associated with the construction machine performing computationally complex and time-consuming tasks that require high-performance computing resources, as described above.

The present disclosure solves one or more of the problems set forth above and/or other problems in the art.

SUMMARY

A method performed by a controller of a work machine includes receiving, from one or more sensor devices of the work machine, sensor data of an environment that includes a ground surface on which the work machine is located; determining whether a wireless connection is viable; selectively transmitting the sensor data to one or more remote computing devices for processing or processing the sensor data locally by the work machine, based on the determining whether the wireless connection is viable, wherein, when the wireless connection is viable, the sensor data is transmitted to the one or more remote computing devices to cause the one or more remote computing devices to process the sensor data to provide first processed data, wherein the first processed data includes at least one of first surface data regarding one or more portions of the ground surface or first volume data regarding a volume of material moved or to be moved by the work machine, wherein, when the wireless connection is not viable, the sensor data is processed locally by the work machine to generate second processed data, wherein the second processed data includes at least one of second surface data regarding the one or more portions of the ground surface or second volume data regarding the volume of material moved or to be moved by the work machine; and providing the first processed data or the second processed data to facilitate an operation of the work machine.

A system comprising: one or more sensor devices configured to obtain sensor data of an environment that includes a ground surface on which a work machine is located; and a controller configured to: determine whether a wireless connection is viable; transmit, using a wireless communication component, the sensor data to one or more remote computing devices for processing when the wireless connection is viable, wherein the sensor data is transmitted to the one or more remote computing devices to cause the one or more remote computing devices to filter the sensor data and generate processed data; receive, from the one or more remote computing devices, the processed data, wherein the processed data includes at least one of surface data regarding one or more portions of the ground surface or volume data regarding a volume of material moved or to be moved by the work machine; and provide the processed data to facilitate an operation of the work machine.

A machine comprising: an implement; one or more sensor devices configured to obtain sensor data of an environment that includes a ground surface on which the machine is located; a wireless communication component; and a controller configured to: determine whether a wireless connection is viable; transmit, using the wireless communication component, a request to one or more remote computing devices based on determining that the wireless connection is viable, wherein the request, including the sensor data, is transmitted to the one or more remote computing devices to cause the one or more remote computing devices to filter the sensor data and generate processed data after filtering the sensor data; receive, from the one or more remote computing devices, the processed data, wherein the processed data includes at least one of surface data regarding one or more portions of the ground surface or volume data regarding a volume of material moved or to be moved by the implement; and provide the processed data to facilitate at least one of: a movement of the machine in the environment, or an operation of the implement of the machine.

DETAILED DESCRIPTION

The present disclosure is directed to a machine selectively transmitting sensor data (e.g., from a stereo camera) to one or more computing devices for processing or processing the sensor data locally based on whether a wireless connection is viable. The wireless connection may be viable when the machine has established the wireless connection with the one or more computing devices or when the machine has established the wireless connection and a rate of data transmission (of the wireless connection) satisfies a transmission rate threshold. For example, the sensor data may be transmitted, to the one or more computing devices for processing, when the wireless connection is viable. The sensor data may be transmitted via a satellite device configured for high-speed communication or via a cellular network configured for high-speed communication (e.g., a 5G network). The one or more computing devices may include one or more cloud computing devices (e.g., one or more high-performance remote computing devices).

The one or more computing devices may process the sensor data to generate processed data. The processed data may be transmitted (e.g., via the satellite device or the cellular network) to the machine to facilitate an operation of the machine (e.g., to facilitate a material moving operation, a navigation operation, among other examples). The machine may suspend transmission of and buffer the sensor data in the event of an outage of wireless communication or in the event the wireless connection is established and the rate of data transmission (of the wireless connection) does not satisfy the transmission rate threshold. The machine may resume transmission of the sensor data when the wireless communication is re-established or when the rate of data transmission (of the wireless connection) satisfies the transmission rate threshold. In some instances, when the wireless connection is not viable, the machine may suspend an operation (of the machine) that relies on the processed data (e.g., suspend an autonomous navigation operation, suspend an autonomous material moving operation, among other examples). In some examples, when the wireless connection is not viable, the sensor data may be processed locally on the machine. The wireless connection may not be viable when the machine has not established the wireless connection with the one or more computing devices or when the machine has established the wireless connection and the rate of data transmission does not satisfy the transmission rate threshold. The machine may provide a notification (e.g., to an operator of the machine) indicating that the sensor data cannot be transmitted to the one or more remote computing devices and/or that the sensor data is being processed locally on the machine.

The term "machine" may refer to a machine that performs an operation associated with an industry such as, for example, mining, construction, farming, transportation, or another industry. Moreover, one or more implements may be connected to the machine. As an example, a machine may include a construction vehicle, a work vehicle, or a similar vehicle associated with the industries described above.

Figure 1:
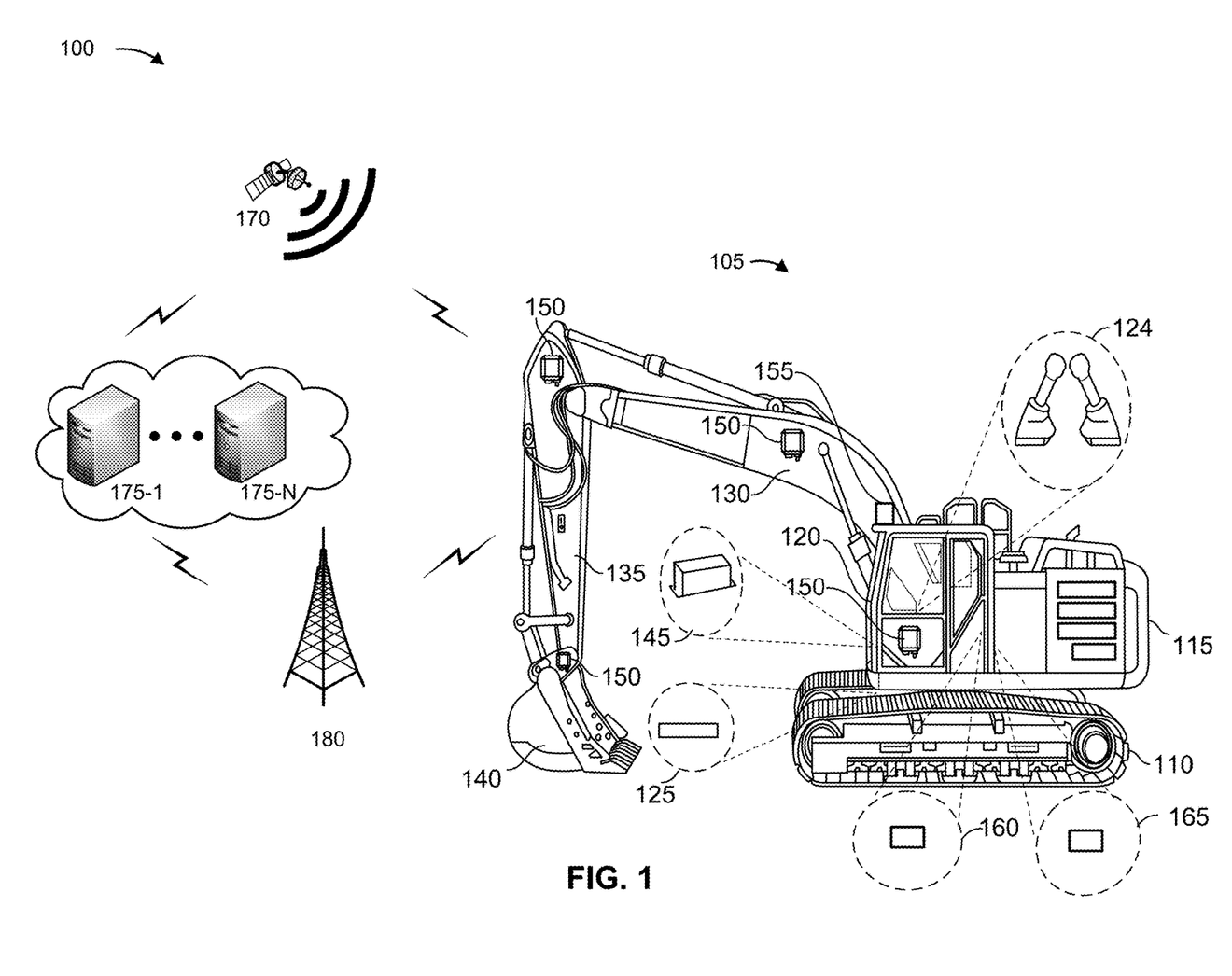
FIG. 1 is a diagram of an example implementation described herein.

FIG. 1 is a diagram of an example implementation 100 described herein. As shown in FIG. 1, the example implementation 100 includes a machine 105. Machine 105 is embodied as an earth moving machine, such as an excavator. Alternatively, the machine 105 may be another type of machine, such as a dozer.

As shown in FIG. 1, machine 105 includes ground engaging members 110, a machine body 115, an operator cabin 120, and a swivel element 125. Ground engaging members 110 may include tracks (as shown in FIG. 1), wheels, rollers, and/or the like, for propelling machine 105. Ground engaging members 110 are mounted on a rotating frame (not shown) and are driven by one or more engines and drive trains (not shown). Machine body 115 is mounted on the rotating frame (not shown). Operator cabin 120 is supported by machine body 115. Operator cabin 120 includes an integrated display (not shown) and operator controls 124, such as, for example, an integrated joystick. Operator controls 124 may include one or more input components.

For an autonomous machine, operator controls 124 may not be designed for use by an operator and, rather, may be designed to operate independently from an operator. In this case, for example, operator controls 124 may include one or more input components that provide an input signal for use by another component without any operator input. Swivel element 125 may include one or more components that enable the rotating frame (and machine body 115) to rotate (or swivel). For example, swivel element 125 may enable the rotating frame (and machine body 115) to rotate (or swivel) with respect to ground engaging members 110.

As shown in FIG. 1, machine 105 includes a boom 130, a stick 135, and a machine work tool 140. Boom 130 is pivotally mounted at its proximal end to machine body 115, and is articulated relative to machine body 115 by one or more fluid actuation cylinders (e.g., hydraulic or pneumatic cylinders), electric motors, and/or other electro-mechanical components. Stick 135 is pivotally mounted at a distal end of boom 130 and is articulated relative to boom 130 by one or more fluid actuation cylinders, electric motors, and/or other electro-mechanical components. Boom 130 and/or stick 135 may be referred to as linkage. Machine work tool 140 is mounted at a distal end of stick 135 and may be articulated relative to stick 135 by one or more fluid actuation cylinders, electric motors, and/or other electro-mechanical components. Machine work tool 140 may be a bucket (as shown in FIG. 1) or another type of tool that may be mounted on stick 135. Machine work tool 140 may be referred to as an implement.

As shown in FIG. 1, machine 105 includes a controller 145 (e.g., an electronic control module (ECM), a computer vision controller, an autonomy controller, among other examples), one or more inertial measurement units (IMUs) 150 (referred to herein individually as "IMU 150," and collectively referred to as "IMUs 150"), a stereo camera 155, a wireless communication component 160, and one or more sensor devices 165. Controller 145 may control and/or monitor operations of machine 105. For example, controller 145 may control and/or monitor the operations of machine 105 based on signals from operator controls 124, signals from IMUs 150, signals from stereo camera 155, signals from wireless communication component 160, and/or signals from one or more sensor devices 165.

As shown in FIG. 1, IMUs 150 are installed at different positions on components or portions of machine 105, such as, for example, on machine body 115, boom 130, stick 135, and machine work tool 140. An IMU 150 includes one or more devices that are capable of receiving, generating, storing, processing, and/or providing signals indicating a position and orientation of a component, of machine 105, on which the IMU 150 is installed. For example, IMU 150 may include one or more accelerometers and/or one or more gyroscopes. The one or more accelerometers and/or the one or more gyroscopes generate and provide signals that can be used to determine a position and orientation of the IMU 150 relative to a frame of reference and, accordingly, a position and orientation of the component. While the example discussed herein refers to IMUs 150, the present disclosure is applicable to using one or more other types of sensor devices that may be used to determine a position and orientation of a component of machine 105.

Stereo camera 155 may include one or more devices that are capable of obtaining and providing sensor data of an environment that includes a ground surface on which machine 105 is located. The sensor data may include image data (e.g., three-dimensional (3D) image data) of the environment. While the example discussed herein refers to stereo camera 155, the present disclosure is applicable to using one or more other types of devices, such as a light detection and ranging (LIDAR) device, and/or a radio detection and ranging (RADAR) device, among other examples of devices (e.g., sensor devices) that are configured to provide data regarding the environment. Unless specifically stated otherwise, any following reference to a stereo camera 155 should be understood to encompass these other devices.

FIG. 1 shows a single stereo camera 155 as being included with machine 105. In practice, machine 105 may include one or more additional stereo cameras 155 and/or differently arranged stereo cameras 155 (e.g., stereo cameras 155 provided on other portions of machine 105). For example, stereo cameras 155 may be provided on boom 130, stick 135, and machine work tool 140.

Wireless communication component 160 includes one or more devices that enable machine 105 to communicate with other devices, as described herein. Wireless communication component 160 may include a transceiver, a separate transmitter and receiver, and an antenna, among other examples. Wireless communication component 160 may transmit the sensor data (e.g., from stereo camera 155) to one or more computing devices, and may receive processed data from the one or more computing devices, as described herein.

Wireless communication component 160 may be configured to transmit the sensor data as a continuous flow of data from stereo camera 155. In some examples, wireless communication component 160 may transmit the sensor data and may receive the processed data via a satellite device, via a base station, and/or via another device that may enable wireless communication component 160 to transmit data to and receive data from the one or more computing devices, as described below.

Wireless communication component 160 may communicate with the one or more computing devices via a network that includes one or more wired and/or wireless networks, such as a cellular network (e.g., a 5G network, a long-term evolution (LTE) network, a code division multiple access (CDMA) network, a 3G network, a 4G network, or another type of cellular network), the Internet, a cloud computing network, a wireless local area network (LAN), an intranet, a fiber optic-based network, a wide area network (WAN), a public land mobile network (PLMN), a metropolitan area network (MAN), a telephone network (e.g., the Public Switched Telephone Network (PSTN)), a private network, and an ad hoc network, among other examples, and/or a combination of these or other types of networks.

Sensor device 165 includes one or more devices that are capable of receiving, generating, storing, processing, and/or providing signals regarding one or more components of machine 105. For example, sensor device 165 may include a hydraulic displacement sensor, a pressure sensor (e.g., for a hydraulic cylinder), a machine speed sensor, an engine speed sensor, and/or a global positioning system (GPS) device, among other examples.

As further shown in FIG. 1, the example implementation 100 involves a satellite device 170, and includes one or more computing devices 175-1 through 175-N (N≥1) (hereinafter referred to collectively as computing devices 175, and individually as computing device 175), and also involves a base station 180. Satellite device 170 may include one or more devices that are configured for high-speed communication (e.g., a geostationary satellite that is configured for high-speed communication). For example, satellite device 170 may be configured to provide high-speed Internet access (e.g., to machine 105 via wireless communication component 160).

Computing device (or remote computing device) 175 may include one or more devices that are configured to process sensor data to generate processed data as explained herein. Computing device 175 may be implemented as a single computing device (e.g., a single server) or multiple computing devices (e.g., multiple servers), such as multiple computing devices in one or more data centers. In some examples, computing device 175 may be included in a cloud computing environment. Additionally, or alternatively, computing device 175 may be included in a back office system.

Base station 180 may be connected to a cellular network (e.g., described above). For example, base station 180 may be connected to a 5G network. Base station 180 may include a base transceiver station, a radio base station, a node B, an evolved node B (eNB), a next generation node B (gNB), a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, and/or a femtocell base station, or a similar type of device.

As indicated above, FIG. 1 is provided as an example. Other examples may differ from what was described in connection with FIG. 1.

Figure 2:
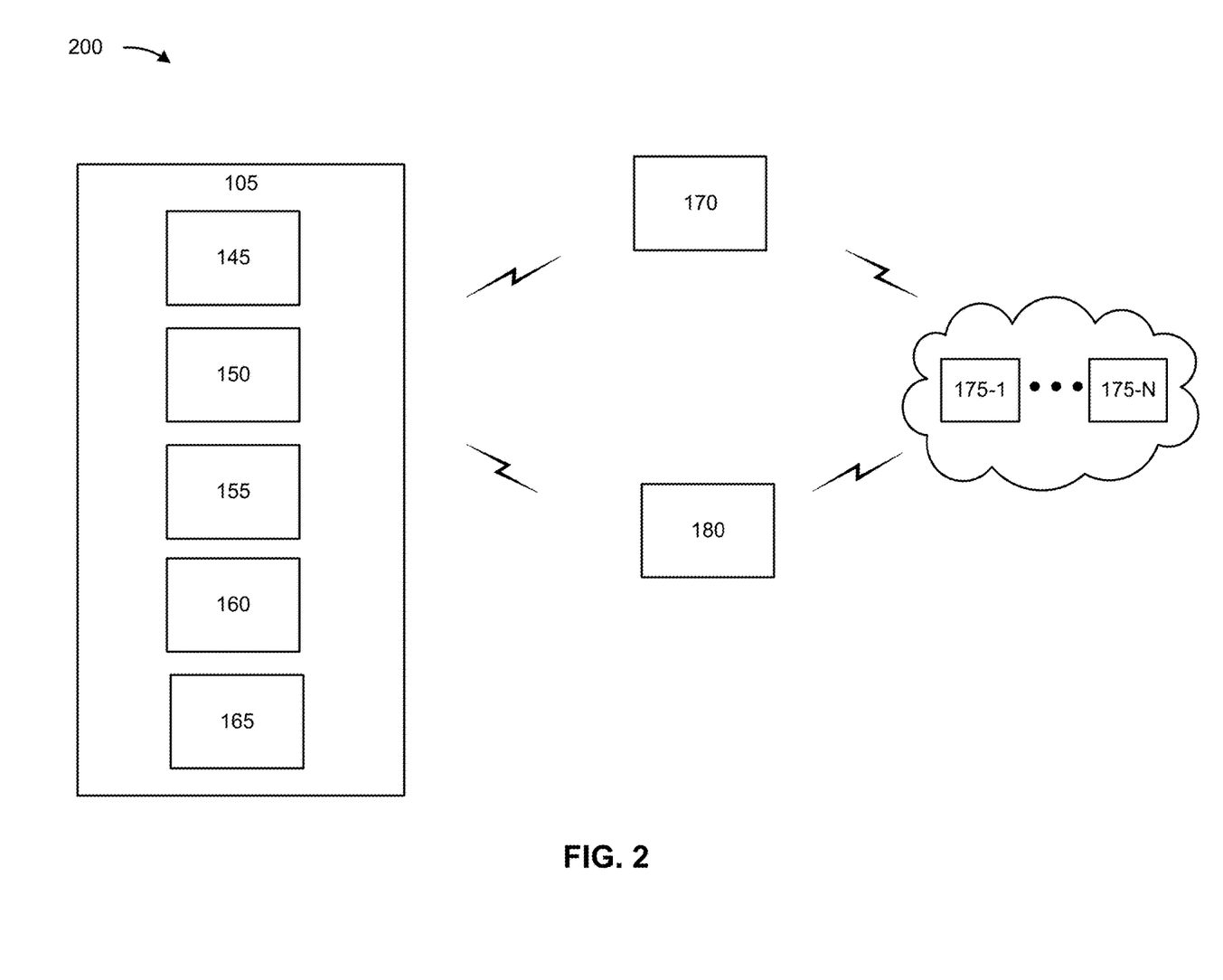
FIG. 2 is a diagram of an example system described herein.

FIG. 2 is a diagram of an example system 200 described herein. As shown in FIG. 2, system 200 includes controller 145, IMU 150, stereo camera 155, wireless communication component 160, one or more sensor devices 165, one or more computing devices 175, and also involves satellite device 170 and base station 180. Controller 145 may be configured to cause sensor data from stereo camera 155 to be processed by one or more computing devices 175 or processed locally on machine 105, as described in more detail below.

IMUs 150 may include one or more first IMUs 150, one or more second IMUs 150, and one or more third IMUs 150. The one or more first IMUs 150 may be located on boom 130 and/or stick 135. The one or more first IMUs 150 may generate signals that may be used to determine a position and/or an orientation of boom 130 and/or stick 135 and the signals may be used to generate linkage pose data that indicates the position and/or the orientation of boom 130 and/or stick 135. The one or more second IMUs 150 may be located on machine work tool 140. The one or more second IMUs 150 may generate signals that may be used to determine a position and/or an orientation of machine work tool 140 and the signals may be used to generate implement pose data that indicates the position and/or the orientation of machine work tool 140. The one or more third IMUs 150 may be located on machine body 115. The one or more third IMUs 150 may generate signals that may be used to determine a position and/or an orientation of machine body 115 and the signals may be used to generate machine pose data that indicates the position and/or the orientation of machine body 115.

IMUs 150 may provide the linkage pose data, the implement pose data, and/or the machine pose data to controller 145 periodically (e.g., every thirty seconds, every minute, every five minutes, among other examples). Additionally, or alternatively, IMUs 150 may provide the linkage pose data, the implement pose data, and/or the machine pose data to controller 145 based on a triggering event. The triggering event may include a request from controller 145, detecting a movement of machine body 115, detecting a movement of machine work tool 140, detecting a movement of machine body 115, detecting a movement of boom 130 and/or stick 135, a request from the operator, a request from the back office system, machine 105 initiating a new task, machine 105 relocating to a different geographical location, after machine 105 has completed a dig cycle, and/or after machine work tool 140 has completed a dig and during a swing prior to a dump of material, among other examples. The linkage pose data, the implement pose data, and/or the machine pose data may be transmitted to the one or more remote computing devices at a rate that is same as a rate at which the sensor data transmitted to the one or more remote computing devices. The linkage pose data, the implement pose data, and/or the machine pose data may be transmitted in this manner in order to synchronize the sensor data and the linkage pose data, the implement pose data, and/or the machine pose data. Alternatively, the linkage pose data, the implement pose data, and/or the machine pose data may be timestamped so that images (from the sensor data) can be registered to world coordinates using data from IMUs 150, and correlated to other data from machine 105. If camera frames and sensor time samples cannot be synchronized exactly, then time interpolation of the sensor data may be performed to align the sensor data and the linkage pose data, the implement pose data, and/or the machine pose data in time.

Stereo camera 155 may be configured to obtain sensor data of an environment that includes a terrain surrounding machine 105 and includes a ground surface on which machine 105 is located. The sensor data may include image data of the environment (e.g., images of the environment). In some instances, the sensor data may include 3D image data of the environment. Stereo camera 155 may provide the sensor data to controller 145 periodically (e.g., every second, every other second, among other examples). Additionally, or alternatively, stereo camera 155 may provide the sensor data to controller 145 based on a triggering event (e.g., a request from controller 145).

Wireless communication component 160 may be configured to establish a wireless connection with one or more computing devices 175 via satellite device 170 or via base station 180 (e.g., establish the wireless connection with satellite device 170 or with base station 180, which in turn establish wireless connection with the one or more computing devices). Wireless communication component 160 may be configured to attempt to establish the wireless connection periodically (e.g., every thirty seconds, every minute, among other examples) and/or based on a triggering event (e.g., based on a request from controller 145, based on receiving an indication that machine 105 is operating in an autonomous mode, based on wireless communication component 160 being initiated, among other examples).

Wireless communication component 160 may transmit, via the wireless connection, the sensor data (obtained by stereo camera 155) to the one or more computing devices 175 for processing. The one or more computing devices 175 may process the sensor data to generate processed data and wireless communication component 160 may receive the processed data from the one or more computing devices 175 via the wireless connection.

Wireless communication component 160 may be configured to prioritize establishing the wireless connection with satellite device 170 (e.g., over establishing the wireless connection with base station 180). For example, wireless communication component 160 may be configured to establish the wireless connection with satellite device 170 if the signal strength of base station 180 does not exceed the signal strength of satellite device 170 by a threshold difference. As another example, wireless communication component 160 may be configured to establish the wireless connection with satellite device 170 if the signal strength of satellite device 170 satisfies a signal strength threshold irrespective of the signal strength of base station 180.

Wireless communication component 160 may be pre-configured with information identifying the threshold difference, may receive the information identifying the threshold difference from a device of an operator of machine 105, and may receive the information identifying the threshold difference from the back office system, among other examples. Alternatively to prioritizing establishing the wireless connection with satellite device 170, wireless communication component 160 may be configured to prioritize establishing the wireless connection with base station 180 (e.g., over establishing the wireless connection with satellite device 170) in a manner similar to the manner described above in connection with satellite device 170.

In some implementations, wireless communication component 160 may be configured to establish the wireless connection based on the relative signal strength of satellite device 170 and the signal strength of base station 180. For example, wireless communication component 160 may be configured to establish the wireless connection with satellite device 170 when the signal strength of satellite device 170 exceeds the signal strength of base station 180. Alternatively, wireless communication component 160 may be configured to establish the wireless connection with base station 180 when the signal strength of base station 180 exceeds the signal strength of satellite device 170.

Wireless communication component 160 (and/or controller 145) may periodically (e.g., every fifteen seconds, every thirty seconds, among other examples) determine the signal strength of satellite device 170 and the signal strength of base station 180. In this regard, wireless communication component 160 may periodically alternate between establishing the wireless connection with satellite device 170 or establishing the wireless connection with base station 180 based on periodically determining the signal strength of satellite device 170 and the signal strength of base station 180.

As an example of periodically alternating establishing the wireless connection, assume that wireless communication component 160 has established the wireless connection with satellite device 170. Wireless communication component 160 may terminate the wireless connection with satellite device 170 and establish the wireless connection with base station 180 if wireless communication component 160 (and/or controller 145) determines that the signal strength of base station 180 exceeds the signal strength of satellite device 170 (and vice versa).

Additionally, or alternatively, to determining the signal strengths periodically, wireless communication component 160 (and/or controller 145) may determine the signal strength of satellite device 170 and the signal strength of base station 180 based on a triggering event (e.g., based on a request from controller 145, based on an indication of a change of an operation of machine 105, among other examples). Wireless communication component 160 may alternate between establishing the wireless connection with satellite device 170 or establishing the wireless connection with base station 180 based on the triggering event.

By alternating (e.g., periodically and/or based on the triggering event) between establishing the wireless connection with satellite device 170 or establishing the wireless connection with base station 180, wireless communication component 160 may maintain communication with the one or more computing devices 175 and attempt to minimize disruption of transmitting the sensor data and/or receiving the processed data. By preventing any disruption of transmitting the sensor data and/or receiving the processed data, wireless communication component 160 and/or controller 145 may prevent any disruption of an operation performed by machine 105.

In some examples, wireless communication component 160 may determine that the wireless connection cannot be established with satellite device 170 when the signal strength of satellite device 170 does not satisfy a signal strength threshold. Similarly, wireless communication component 160 may determine that the wireless connection cannot be established with base station 180 when the signal strength of base station 180 does not satisfy the signal strength threshold. Controller 145 may determine that the sensor data is to be processed locally on machine 105 when neither the signal strength of satellite device 170 nor the signal strength of base station 180 satisfies the signal strength threshold. Wireless communication component 160 may be pre-configured with information identifying the signal strength threshold, may receive the information identifying the signal strength threshold from a device of the operator, may receive the information identifying the signal strength threshold from the back office system, among other examples.

Wireless communication component 160 may be configured to establish the wireless connection based on an output of a machine learning model. For example, wireless communication component 160 (and/or controller 145) may use the machine learning model to predict whether wireless communication component 160 is to establish the wireless connection with satellite device 170, whether wireless communication component 160 is to establish the wireless connection with base station 180, or whether wireless communication component 160 is not to establish the wireless connection with satellite device 170 or base station 180.

For instance, controller 145 may provide as an input, to the machine learning model, information identifying a current geographical location and/or a current geographical area of machine 105, information identifying one or more obstructions in the current geographical location and/or the current geographical area (e.g., one or more images of the one or more obstructions), information identifying a time of day, and/or information identifying a predicted weather condition, among other examples. The input may be obtained from a device of the operator, from stereo camera 155, and/or from one or more sensor devices 165, among other examples. Based on the input, the machine learning model may provide, as an output, predicted connection information indicating whether wireless communication component 160 is to establish the wireless connection with satellite device 170, is to establish the wireless connection with base station 180, or is not to establish the wireless connection with satellite device 170 or base station 180.

The machine learning model may be trained using historical data that includes historical data of geographical locations and/or geographical areas, historical data (e.g., images) of obstructions in the historical geographical locations and/or geographical areas, historical times of the day, historical data of weather conditions at the historical geographical locations and/or geographical areas, historical signal strengths of satellite device 170 and base station 180 at the historical geographical locations and/or geographical areas (e.g., in light of the historical obstructions, the historical times, the historical weather conditions, among other examples), historical latencies of satellite device 170 and base station 180 at the historical geographical locations and/or geographical areas, and/or historical data indicating the wireless connections that were established (e.g., satellite device 170 or base station 180), among other examples.

The machine learning model may be generated and trained by a trainer device, which may be a discrete hardware component or software component (not shown). The trainer device may be included in the back office system, or may be included in the one or more computing devices 175, among other examples. The trainer device may provide the machine learning model to machine 105 for use by controller 145 and/or wireless communication component 160. The trainer device may update and provide (e.g., on a scheduled basis, on an on-demand basis, on a triggered basis, and/or on a periodic basis, among other examples) the machine learning model to machine 105. In some instances, controller 145 may obtain additional training data (e.g., additional historical data similar to the historical data described above) and cause the machine learning model to be retrained based on the additional training data. For example, controller 145 may provide the additional training data to the trainer device to retrain the machine learning model. The machine learning model may be retrained on a periodic basis and/or based on a triggering event.

When training the machine learning model, the trainer device may portion the training data into a training set (e.g., a set of data to train the machine learning model), a validation set (e.g., a set of data used to evaluate a fit of the machine learning model and/or to fine tune the machine learning model), a test set (e.g., a set of data used to evaluate a final fit of the machine learning model), and/or the like. The trainer device may preprocess and/or perform dimensionality reduction to reduce the training data to a minimum feature set. The trainer device may train the machine learning model on this minimum feature set, thereby reducing processing to train the machine learning model, and may apply a classification technique, to the minimum feature set.

The trainer device may use a classification technique, such as a logistic regression classification technique, a random forest classification technique, a gradient boosting machine learning (GBM) technique, and/or the like, to determine a categorical outcome (e.g., whether to establish the wireless connection with satellite device 170 or base station 180). In addition to, or as an alternative to use the classification technique, the trainer device may use a naïve Bayesian classifier technique. In this case, the device may perform binary recursive partitioning to split the training data of the minimum feature set into partitions and/or branches and use the partitions and/or branches to perform predictions (e.g., whether to establish the wireless connection with satellite device 170 or base station 180). Based on using recursive partitioning, the trainer device may reduce utilization of computing resources relative to manual, linear sorting and analysis of data items, thereby enabling use of thousands, millions, or billions of data items to train a model, which may result in a more accurate model than using fewer data items.

The trainer device may train the machine learning model using a supervised training procedure that includes receiving input to the machine learning model from a subject matter expert (e.g., one or more operators associated with machine 105 and/or the one or more machines), which may reduce an amount of time, an amount of processing resources, and/or the like to train the machine learning model relative to an unsupervised training procedure. The trainer device may use one or more other model training techniques, such as a neural network technique, a latent semantic indexing technique, and/or the like.

For example, the trainer device may perform an artificial neural network processing technique (e.g., using a two-layer feedforward neural network architecture, a three-layer feedforward neural network architecture, and/or the like) to perform pattern recognition with regard to patterns of establishing the wireless connection with satellite device 170 or base station 180. In this case, using the artificial neural network processing technique may improve an accuracy of the machine learning model generated by the trainer device by being more robust to noisy, imprecise, or incomplete data, and by enabling the trainer device to detect patterns and/or trends undetectable to human analysts or systems using less complex techniques.

In the example that follows, assume that stereo camera 155 has provided the sensor data to controller 145. For example, stereo camera 155 may provide the sensor data to controller 145 in a manner similar to the manner described above. For instance, assume that stereo camera 155 has received a request from controller 145 for the sensor data. Stereo camera 155 may provide the sensor data to controller 145 based on receiving the request. Controller 145 may receive the sensor data from stereo camera 155 and determine whether to cause the sensor data to be transmitted to one or more computing devices 175 for processing or cause the sensor data to be processed locally on machine 105.

As part of determining whether to cause the sensor data to be transmitted to the one or more computing devices 175 for processing or cause the sensor data to be processed locally on machine 105, controller 145 may determine whether the wireless connection is viable. The wireless connection may be viable when wireless communication component 160 has established the wireless connection with satellite device 170 or base station 180 or when wireless communication component 160 has established the wireless connection and the rate of data transmission satisfies the transmission rate threshold. The transmission rate threshold may be determined by the operator, may be determined by the back office system, may be stored in a memory of machine 105, among other examples. Controller 145 may cause wireless communication component 160 to transmit the sensor data, via the wireless connection, to the one or more computing device 175 when the wireless connection is viable. Alternatively, controller 145 may cause the sensor data to be processed locally on machine 105 when the wireless connection is not viable. The wireless connection may not be viable when wireless communication component 160 has not established the wireless connection with satellite device 170 or base station 180 or when wireless communication component 160 has established the wireless connection and the rate of data transmission does not satisfy the transmission rate threshold.

In some examples, controller 145 may receive, from wireless communication component 160, wireless connection information indicating whether the wireless connection is viable and controller 145 may determine whether the wireless connection is viable based on the wireless connection information. In some examples, controller 145 may determine whether wireless communication component 160 needs to establish the wireless connection (e.g., with satellite device 170 or base station 180) and may provide an instruction, to wireless communication component 160, to establish the wireless connection based on determining whether wireless communication component 160 is to establish the wireless connection with satellite device 170 or with base station 180.

Controller 145 may receive the wireless connection information from wireless communication component 160 after providing the instruction and may determine whether the wireless connection is viable based on the wireless connection information. Alternatively to providing the instruction based on determining whether wireless communication component 160 needs to establish the wireless connection, controller 145 may provide the instruction, to wireless communication component 160, to establish the wireless connection without determining whether wireless communication component 160 is able to establish the wireless connection. For example, controller 145 may provide the instruction based on receiving the sensor data.

As part of determining whether wireless communication component 160 is to establish the wireless connection, controller 145 may determine whether machine 105 is in an idle state or in an active state, determine whether machine work tool 140 is in a locked position or in an unlocked position, determine whether the signal strength of satellite device 170 or the signal strength of base station 180 satisfies the signal strength threshold, determine whether machine 105 is operating in a manual mode or in an autonomous mode, determine a geographical location of machine 105, among other examples. As an example, controller 145 may obtain machine speed data identifying a ground speed of machine 105 and/or engine speed data identifying an engine speed of machine 105 from one or more sensor devices 165. Controller 145 may determine whether machine 105 is in an idle state or in an active state based on the ground speed and/or the engine speed.

For example, controller 145 may determine that machine 105 is in the idle state when the ground speed does not satisfy a ground speed threshold and/or when the engine speed does not satisfy an engine speed threshold. Conversely, controller 145 may determine that machine 105 is in the active state when the ground speed satisfies the ground speed threshold and/or when the engine speed satisfies the engine speed threshold. Controller 145 may provide the instruction, to wireless communication component 160, to establish the wireless connection when machine 105 is in the active state or when machine 105 has been in the idle state for an amount of time that does not satisfy a threshold amount of time. Alternatively, controller 145 may provide the instruction, to wireless communication component 160, to not establish the wireless connection when machine 105 has been in the idle state for an amount of time that satisfies the threshold amount of time.

Controller 145 may determine whether machine work tool 140 is in the locked position or in the unlocked position based on input from a lever (or a button) in operator cabin 120. For example, the operator may use the lever to lock (or immobilize) or unlock machine work tool 140. For instance, the operator may use the lever to lock or unlock a hydraulic system associated with machine work tool 140. When the hydraulic system is locked, no hydraulic fluid may flow to linkage hydraulic cylinders, swing pump motor, or track pump motors of the hydraulic system. When the hydraulic system is unlocked, the hydraulic fluid may flow to the linkage hydraulic cylinders, the swing pump motor, or the track pump motors of the hydraulic system. The lever may generate a value indicating that machine work tool 140 is locked or unlocked. Controller 145 may provide the instruction, to wireless communication component 160, to establish the wireless connection when machine work tool 140 is in the unlocked position. Controller 145 may obtain information identifying the signal strength of satellite device 170 or information identifying the signal strength of base station 180 from wireless communication component 160. Controller 145 may provide the instruction, to wireless communication component 160, to establish the wireless connection when the signal strength of satellite device 170 or the signal strength of base station 180 satisfies the signal strength threshold. Conversely, controller 145 may determine that wireless communication component 160 is not able to establish the wireless connection (e.g., with satellite device 170 or with base station 180) when neither the signal strength of satellite device 170 nor the signal strength of base station 180 satisfies the signal strength threshold. Controller 145 may determine that the sensor data (from stereo camera 155) is to be processed locally based on determining that wireless communication component 160 is not able to establish the wireless connection.

Controller 145 may obtain (e.g., from a memory of machine 105) operation information indicating whether machine 105 is operating in the manual mode or in the autonomous mode. Controller 145 may provide the instruction to wireless communication component 160 to establish the wireless connection when the operation information indicates that machine 105 is operating in the autonomous mode.

Controller 145 may obtain (e.g., from one or more sensor devices 165) location data identifying the geographical location of machine 105. If controller 145 determines that the geographical location is an underground location, a building, a covered structure, among other locations that may prevent wireless communication component 160 from communicating with satellite device 170 or base station 180, controller 145 may prevent wireless communication component 160 from attempting to establish the wireless connection. Alternatively, controller 145 may provide the instruction to wireless communication component 160 to establish the wireless connection when controller 145 determines that the geographical location is not a location that may prevent wireless communication component 160 from communicating with satellite device 170 or base station 180. Controller 145 may perform similar actions with respect to information regarding a predicted weather condition at the geographical location such that wireless communication could not be established by wireless communication component 160. By preventing wireless communication component 160 from attempting to establish the wireless connection as described above, controller 145 may preserve computing resources that would otherwise been used to unsuccessfully attempt to establish the wireless connection (e.g., due to the geographical location, the predicted weather condition, among other examples).

Assume that controller 145 provides the instruction to wireless communication component 160 to establish the wireless connection. Based on the instruction, controller 145 may establish the wireless connection (e.g., with satellite device 170 or with base station 180) in a manner similar to the manner described above and provide an indication that the wireless connection is established. Assume that controller 145 determines that the wireless connection is viable (e.g., based on the indication from wireless communication component 160). Based on determining that the wireless connection is viable, controller 145 may cause wireless communication component 160 to transmit, via the wireless connection, the sensor data (from stereo camera 155) to the one or more computing devices 175 for processing.

The sensor data may include the images obtained by stereo camera 155 and/or a disparity map generated based on the images. In some instances, machine 105 may include a LIDAR device. In such instances, the sensor data may include a 3D point cloud of the environment based on data obtained by the LIDAR device. The one or more computing devices 175 may receive the sensor data and may process the sensor data to generate the processed data.

When processing the sensor data, the one or more computing devices 175 may perform one or more operations (e.g., filtering operations) on the sensor data. For example, the one or more computing devices 175 may process the sensor data to remove or reduce an amount of noise (e.g., outlier data) from the sensor data, and/or remove items that may be distorted in the sensor data and that may cause a rendering of the sensor data to be distorted, among other examples. For instance, the one or more computing devices 175 may perform filtering on the sensor data (e.g., perform the filtering on the disparity map) to remove or reduce the amount of noise (e.g., outlier data), and/or remove the items, among other examples.

With respect to performing the filtering, the one or more computing devices 175 may process the sensor data using spatial noise reduction filtering, temporal/time filtering, and/or digital signal processing techniques, among other examples. As a result of processing the sensor data in this manner, the one or more computing devices 175 may enhance a resolution of the sensor data (e.g., enhance a measure of smoothness of the sensor data).

Additionally or alternatively to removing or reducing the noise and/or removing the items, the one or more computing devices 175 may process the sensor data to remove image occlusion from the sensor data. For example, the one or more computing devices 175 may use one or more computer vision techniques to identify and remove one or more items that may have occluded a line of sight of stereo camera 155. For instance, the one or more computing devices 175 may analyze the sensor data using one or more object detection techniques (e.g., a Single Shot Detector (SSD) technique, a You Only Look Once (YOLO) technique, and/or the like) to identify the one or more items. Additionally or alternatively to removing the image occlusion, the one or more computing devices 175 may interpolate data in one or more portions of the sensor data. As an example, the one or more computing devices 175 may perform image processing (e.g., using one or more image processing techniques) on the sensor data to interpolate the sensor data.

By performing the one or more operations described above, the one or more computing devices 175 may enhance a measure of quality of the sensor data and increase a likelihood of identifying useful information that may facilitate an operation of machine 105. Based on performing the one or more operations described above, the one or more computing devices 175 may generate filtered data. The one or more computing devices 175 may process the filtered data (e.g., using a semantic segmentation technique) to determine information regarding one or more pits on the ground surface, information regarding one or more piles of material on the ground surface, information regarding the material, and/or information regarding the material in machine work tool 140, among other examples.

The information regarding the one or more pits may include a location of the one or more pits, a depth of the one or more pits, and/or a geometry (or shape) of the one or more pits, among other examples. The information regarding the one or more piles may include a location of the one or more piles, a height of the one or more piles, a geometry (or shape) of the one or more piles, and/or a volume of the one or more piles, among other examples. The information regarding the material may include a type of the material such as sand, clay, and/or hard rock, among other examples. The information regarding the material in machine work tool 140 may include a volume of the material, a geometry (or shape) of the material, and/or a fill level of machine work tool 140, among other examples.

The information regarding the one or more pits, the information regarding the one or more piles, and/or the information regarding the material may be included in surface data. The surface data may be used by machine 105 to facilitate navigation of machine 105 in the environment. For example, the surface data may be used by machine 105 to identify one or more navigable portions of the environment and identify one or more non-navigable portions of the environment. As an example, the one or more navigable portions may include one or more portions of the ground surface that do not include the one or more pits, and/or that do not include the one or more piles, among other examples of items that may obstruct a navigation operation of machine 105. The one or more non-navigable portions may include one or more portions of the ground surface that include the one or more pits, and/or the one or more piles, among other examples of items that may obstruct a navigation operation of machine 105. In this regard, the surface data may be used for an autonomous navigation operation of machine 105.

The surface data may be used by machine 105 to facilitate a material moving operation of machine 105 (e.g., an excavating operation). For example, the surface data may be used by machine 105 to identify one or more locations of the ground surface (other than locations of the one or more pits and/or the one or more piles) for the material moving operation. In this regard, the surface data may be used for an autonomous material moving operation of machine 105.

The information regarding the material and/or the information regarding the material in machine work tool 140 may be included in volume data. The volume data may be used (e.g., by machine 105, and or by the back office system, among other examples) to determine a measure of productivity of the operator, of machine 105, among other examples. For example, the volume data may include information identifying a volume of material moved by machine 105 over a period of time, and/or information indicating a measure of completion of a material moving task, among other examples.

In some implementations, the one or more computing devices 175 may process the filtered data using one or more machine learning models. For example, the one or more computing devices 175 may provide the filtered data as an input to the one or more machine learning models and the one or more machine learning models may provide, as an output, the information regarding the one or more pits, the information regarding the one or more piles, the information regarding the material, and/or the information regarding the material in machine work tool 140. For instance, a first machine learning model may provide (as an output) the information regarding the one or more pits, a second machine learning model may provide (as an output) the information regarding the one or more piles, a third machine learning model may provide (as an output) the information regarding the material, and so on.

The one or more computing devices 175 may aggregate the different outputs into the processed data that includes the source data and the volume data. Wireless communication component 160 may receive, via the wireless connection, the processed data from the one or more computing devices 175 and may provide the processed data to controller 145 to facilitate an operation of the machine (e.g., a navigation operation, and/or a material moving operation, among other examples). In some instances, the processed data may be provided to a device of a site manager, and/or to a back office system, among other examples.

The one or more machine learning models may be trained using historical data (e.g., historical images, historical disparity maps, and/or historical point clouds) that identify different pits (e.g., different sizes, shapes, and/or depths), different piles (e.g., different sizes, shapes, and/or heights), different types of materials, different volumes of materials, different machine work tools, and/or different volumes of materials in the machine work tools, among other examples. In some instances, PointNet may be an example of the one or more machine learning models used with respect to point clouds. The one or more machine learning models may be trained in a manner similar to the manner described above.

Controller 145 may receive, from one or more sensor devices 165, additional data for processing in conjunction with the sensor data. The additional data may include the implement pose data, the machine pose data, the linkage pose data, hydraulic displacement data, and/or pressure data (e.g., for the hydraulic cylinder), among other examples. Controller 145 may cause wireless communication component 160 to transmit, via the wireless connection, the additional data to the one or more computing devices 175 for processing with the sensor data to generate the processed data.

For example, when determining the volume of material in machine work tool 140, the one or more computing devices 175 may determine coordinates of machine work tool 140 in the disparity map based on the implement pose data. The coordinates of machine work tool 140 may enable the one or more computing devices 175 (and/or the one or more machine learning models) to identify a portion of the sensor data (e.g., a portion of the disparity map) that includes machine work tool 140 when determining the volume of material in machine work tool 140. By identifying the portion of the sensor data, the one or more computing devices 175 (and/or the one or more machine learning models) may preserve computing resources that would have otherwise been used to process an entirety of the sensor data to determine the volume of material in machine work tool 140. In some examples, when determining the volume of the material in machine work tool 140, the one or more computing devices 175 may determine a geometry of machine work tool 140. In some instances, the one or more computing devices 175 may receive information regarding the geometry of machine work tool 140 from machine 105 (e.g., from controller 145 via wireless communication component 160). Alternatively, the one or more computing devices 175 may receive information identifying machine 105 (e.g., from controller 145 via wireless communication component 160) and may use the information identifying machine 105 to obtain the information regarding the geometry of machine work tool 140 (e.g., from a data structure). Based on the information regarding the geometry of machine work tool 140, the one or more computing devices 175 may determine a geometry of an inside surface of machine work tool 140. Based on analyzing the sensor data, the one or more computing devices 175 may determine a portion of the inside surface that is in contact with the material in machine work tool 140. For example, the one or more computing devices 175 may determine how high up machine work tool 140 is the material on all sides of machine work tool 140. Additionally, the one or more computing devices 175 may determine a topography of the material above a top surface of machine work tool 140. The one or more computing devices 175 may combine all the surfaces and calculate one enclosed, single volume.

In some implementations, controller 145 may cause wireless communication component 160 to transmit, via the wireless connection, data (e.g., the sensor data, the additional data, among other examples) based on determining whether machine work tool 140 is buried in the ground surface or has been removed from the ground surface. For example, controller 145 may determine whether machine work tool 140 is buried in the ground surface or has been removed from the ground surface based on the implement pose data and/or the linkage pose data. Controller 145 may cause wireless communication component 160 to transmit the data when machine work tool 140 has been removed from the ground surface.

By determining whether machine work tool 140 is buried in the ground surface or has been removed from the ground surface, controller 145 may prevent wireless communication component 160 from transmitting data that would have caused the one or more computing devices 175 (and/or the one or more machine learning models) to attempt to identify machine work tool 140 when machine work tool 140 is buried in the ground surface during the excavating operation. Accordingly, controller 145 may preserve computing resources that would have otherwise been used to transmit data that may not be useful to the one or more computing devices 175 and/or to attempt to identify machine work tool 140 when machine work tool 140 is buried in the ground surface.

In some implementations, controller 145 may cause wireless communication component 160 to transmit, via the wireless connection, processing information to the one or more computing devices 175 to cause the one or more computing devices 175 to process the sensor data based on the processing information. The processing information may include filtering information identifying a manner for filtering the sensor data (from stereo camera 155) to obtain the filtered data.

For example, the filtering information may include information identifying an order for performing the one or more filtering operations described above, and/or information identifying a different computing device (of the one or more computing devices 175) for performing a different filtering operation, among other examples. Additionally, or alternatively, to including the filtering information, the processing information may include information identifying the one or more machine learning models described above, information indicating that the first machine learning model is to be used to determine the information regarding the one or more pits, information indicating that the second machine learning model is to be used to determine the information regarding the one or more piles, and so on.

In some implementations, after establishing the wireless connection, controller 145 (and/or wireless communication component 160) may determine the signal strength of satellite device 170 and the signal strength of base station 180. Based on determining the signal strength of satellite device 170 and the signal strength of base station 180, controller 145 may periodically cause wireless communication component 160 to establish the wireless connection with satellite device 170, to establish the wireless connection with base station 180, or to terminate the wireless connection or to not attempt to establish the wireless connection. If controller 145 causes wireless communication component 160 to terminate the wireless connection or causes wireless communication component 160 to not attempt to establish the wireless connection, controller 145 may cause the sensor data (from stereo camera 155) to be processed locally on machine 105, as described below.

In some implementations, after establishing the wireless connection, controller 145 may determine whether machine 105 is in the idle state or in the active state, determine whether machine work tool 140 is in the locked position or in the unlocked position, determine whether machine 105 is operating in the manual mode or in the autonomous mode, and/or determine the geographical location of machine 105, as described above. Controller 145 may perform such actions periodically and/or based on a triggering event, as described above.

If controller 145 determines that machine 105 is in the idle state, that machine work tool 140 is in the locked position, that machine 105 is operating in the manual mode, and/or that the geographical location prevents wireless communication component 160 from communicating with satellite device 170 or base station 180, controller 145 may cause wireless communication component 160 to terminate the wireless connection or may cause wireless communication component 160 to not attempt to establish the wireless connection. If controller 145 causes wireless communication component 160 to terminate the wireless connection or causes wireless communication component 160 to not attempt to establish the wireless connection, controller 145 may cause the sensor data (from stereo camera 155) to be processed locally on machine 105, as described below.

In some implementations, controller 145 may cause sensor data, received from stereo camera 155, to be stored when the wireless connection is not viable. For example, assume that controller 145 determines that the wireless connection is not viable as described above and that controller 145 receives the sensor data after determining that the wireless connection is not viable. Based on determining that the wireless connection is not viable, controller 145 may cause the sensor data to be stored (or buffered) locally for a threshold amount of time. In some examples, controller 145 may cause the sensor data to be buffered locally using a circular buffer (or ring buffer), a single buffer, a double buffer, among other examples.

After the threshold amount of time has expired, controller 145 may determine whether the wireless connection is viable (as described above). Assume that controller 145 determines that the wireless connection is viable after the threshold amount of time. Controller 145 may cause the sensor data to be transmitted to the one or more computing devices 175 (as described above) based on determining that the wireless connection is viable after the threshold amount of time. In some instances, if controller 145 determines that the wireless connection is not viable after the threshold amount of time, controller 145 may cause the sensor data to be processed locally as explained below.

In some implementations, controller 145 may cause machine 105 to suspend an operation being performed or initiated by machine 105 when the wireless connection is not viable. For example, assume that controller 145 determines that the wireless connection is not viable (as described above) and that the processed data has not been received from computing device 175. Controller 145 may determine whether machine 105 is performing or is initiating an operation that uses the processed data.

For example, assume that controller 145 determines (e.g., based on information from a memory of machine 105) that machine 105 is performing or is initiating an autonomous operation (e.g., an autonomous navigation operation, an autonomous material moving operation, among other examples). Further assume that the processed data (generated by the one or more computing devices 175) includes the surface data and/or the volume data, that the surface data may be used by machine 105 for the autonomous navigation operation, and that the volume data may be used by machine 105 for the autonomous material moving operation. Based on determining that the wireless connection is not viable prior to the processed data being received and based on determining that machine 105 is performing or is initiating the operation that uses the processed data, controller 145 may cause machine 105 to suspend the operation.

The operation may be suspended until wireless communication component 160 re-establishes the wireless connection and receives, via the wireless connection, the process data from computing device 175. In some instances, controller 145 may cause machine 105 to suspend the operation if controller 145 determines that the wireless connection is not viable for a threshold amount of time (e.g., after transmitting the sensor data). In some instances, after the threshold amount of time, controller 145 may provide a notification indicating that the wireless connection is not viable. The notification may be provided via operator cabin 120 (e.g., via the integrated display), provided to a device of the operator, and/or provided to the back office, among other examples. In some instances, if controller 145 determines that the operation is not an operation that uses the processed data, controller 145 may enable machine 105 to continue performing the operation.

In some implementations, controller 145 may cause the sensor data (from stereo camera 155) to be processed locally for one or more of the reasons described above. Controller 145 may process the sensor data to generate machine processed data. Controller 145 may process the sensor data in a manner similar to the manner described above with respect to the one or more computing devices 175 processing the sensor data. For example, controller 145 may perform the one or more operations (described above) to remove noise from the sensor data, reduce the noise in the sensor data, remove the distorted items from the sensor data, remove the image occlusion from the sensor data, among other examples.

Controller 145 may generate machine filtered data based on performing the one or more operations. The one or more operations performed by controller 145 may be less computationally complex than the one or more operations performed by the one or more computing devices 175. As a result, the machine filtered data may be different than the filtered data by the one or more computing devices 175 (e.g., a resolution of the machine filtered data may be less than the resolution of the filtered data from a computing device 175).

Controller 145 may process the machine filtered data using one or more machine learning models (similar to the one or more machine learning models described above) in a manner similar to the manner described above. As a result of processing the machine filtered data, controller 145 may generate machine processed data that includes machine surface data (similar to the surface data described above) and/or machine volume data (similar to the volume data described above). In some instances, due to the computational constraint of machine 105, the one or more machine learning models (used by controller 145) may provide an output that is less accurate than the output provided by the one or more machine learning models used by the one or more computing devices 175. In this regard, the machine process data may be less accurate than the processed data provided by the one or more computing devices 175.

Controller 145 may determine a volume of an area of interest (e.g., a volume of a pile of material, or a volume of material in machine work tool 140, among other examples). In some situations, controller 145 may determine the volume of material in machine work tool 140 based on a geometry of an inside surface of machine work tool 140, in a manner similar to the manner described above. In some situations, controller 145 may analyze the sensor data (e.g., the images) to identify the area of interest. For example, controller 145 may analyze the images using one or more object detection techniques (e.g., a Single Shot Detector (SSD) technique, a You Only Look Once (YOLO) technique, and/or the like) to identify the area of interest.

Controller 145 may generate a graphical representation (e.g., a three-dimensional (3D) graphical representation or a two-and-a-half dimensional graphical representation) based on the images. The graphical representation may represent an area surrounding machine 105 (or a portion of the area surrounding machine 105) that includes the area of interest. In this regard, the graphical representation may enable controller 145 to determine characteristics of the area surrounding machine 105, including characteristics of the area of interest (e.g., the volume of the area of interest). The graphical representation may be generated based on a disparity map of the images.

Controller 145 may determine a position and/or an orientation of one or more portions of machine 105 based on the implement pose data and/or the machine pose data. Based on the position and/or the orientation of the one or more portions, controller 145 may determine coordinates of the area of interest with respect to machine 105. For example, controller 145 may determine the coordinates of the area of interest with respect to a particular portion of machine 105. For instance, controller 145 may consider the particular portion of machine 105 as a central point of the graphical representation (e.g., coordinates "0,0,0" of the 3D graphical representation) and the coordinates of the area of interest may correspond to coordinates, of the graphical representation, with respect to the central point.

Controller 145 may identify, based on the coordinates, a portion of the 3D graphical representation (hereinafter referred to as "3D portion") corresponding to the area of interest. Controller 145 may identify the 3D portion to preserve computing resources that would have otherwise been used to process an entirety of the 3D graphical representation to determine the volume of the area of interest. Controller 145 may determine a volume of the 3D portion using one or more computational models, one or more computational algorithms, and/or other machine algorithms that may be used to determine a volume of a 3D graphical representation.

In some examples, controller 145 may determine (e.g., periodically and/or based on a triggering event) whether wireless communication component 160 is able to establish the wireless connection, in a manner similar to the manner described above. For example, after determining that the wireless connection is not viable, controller 145 may determine (e.g., periodically and/or based on a triggering event) whether wireless communication component 160 is able to re-establish the wireless connection. Controller 145 may cause wireless communication component 160 is to establish the wireless connection based on determining that wireless communication component 160 is able to re-establish the wireless connection. Wireless communication component 160 may establish the wireless connection as described above.

In some situations, algorithms (used by the one or more computing devices 175 to perform the actions discussed above) may be updated on the one or more computing devices 175 with no or minimal downtime for machine 105. For example, the algorithms may be updated with new features, tools, and/or information to collect new information from existing sensors of machine 105. In this regard, additional value (or functionality) may be added to machine 105 without retrofitting machine 105 with new hardware to process data differently or with no or minimal downtime for machine 105.

With respect to updating the algorithms, once new algorithms (e.g., for noise/artifact removal, feature extraction, machine learning model training, among other examples) have been developed and validated on a non-production machine, the new algorithms may be introduced to production machines in different ways. In one example, the new algorithms can be replaced (on the one or more computing devices 175) under same identifier(s) as identifier(s) of old corresponding algorithms so that existing machines, which send data (to the one or more computing devices 175 for processing), may perceive improvements immediately on upon request. This process is a continuous integration style update on a server side only (e.g., on the one or more computing devices 175 side only) and affects all machines which use the one or more computing devices 175 for remote processing.

As another example, the new algorithms can be replaced (on the one or more computing devices 175) under new identifier(s), and existing machines may have their on-board software flashed with an update that sends requests to the new identifier(s). This process is a continuous integration style update on a server side only (e.g., on the one or more computing devices 175 side only) and a software distribution update on the client side (e.g., on machine 105 side). No hardware changes are needed but new software must be pushed to the machines. This process can be used to manage which machines are upgraded with minimal downtime.

As yet another example, the new algorithms can be provided (on the one or more computing devices 175) under new identifier(s), and existing machines can have their existing on-board software configured to use the new identifier(s), for example through a manual change made through a display. This process is a continuous integration style update on the server side and a software configuration change on the client side. No hardware changes are needed for machine 105. This processing can be used to manage which machines are upgraded with almost no downtime.

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of system 200 may perform one or more functions described as being performed by another set of devices of system 200.

Figure 3:
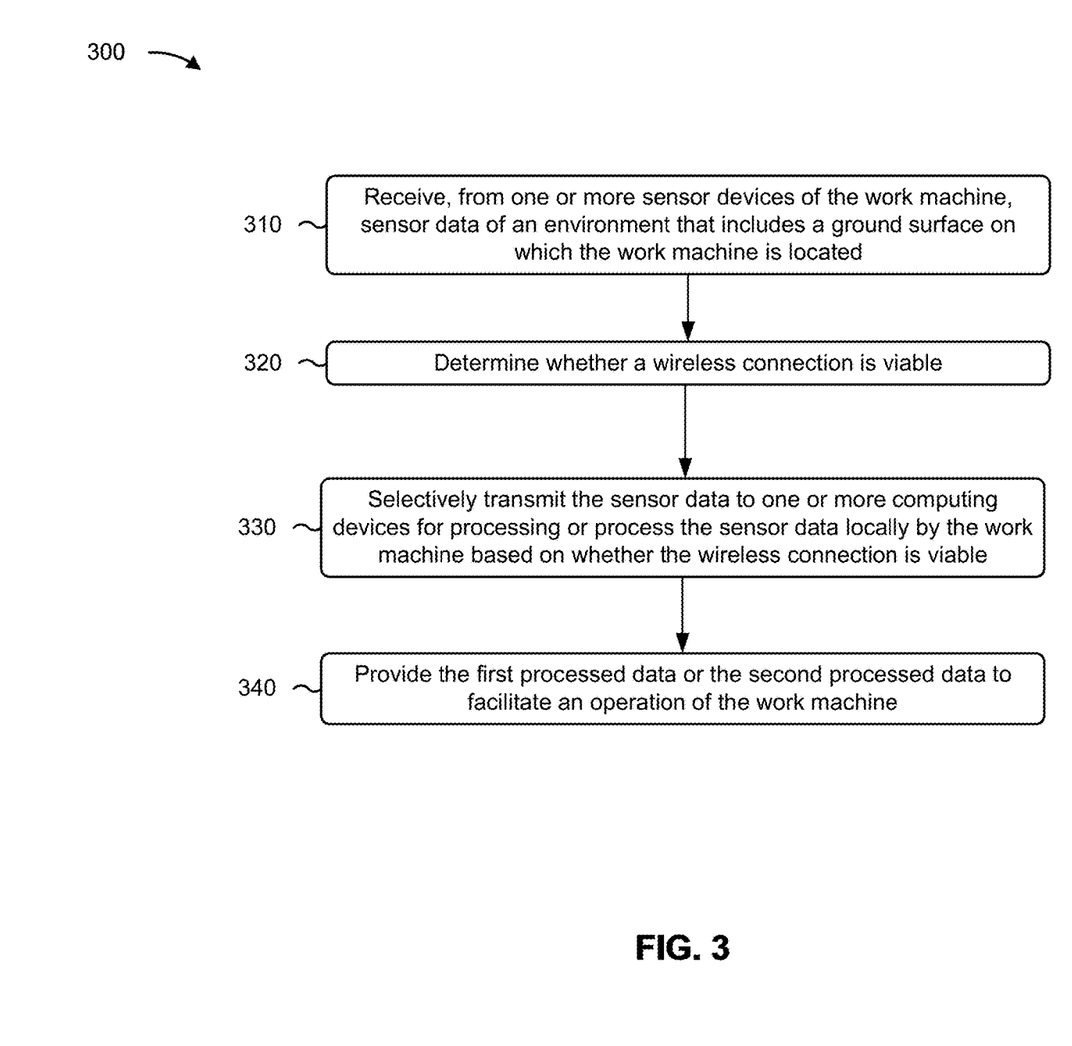
FIG. 3 is a flowchart of an example process relating to remote processing of sensor data.

FIG. 3 is a flowchart of an example process 300 relating to remote processing of sensor data. One or more process blocks of FIG. 3 may be performed by a controller (e.g., controller 145). One or more process blocks of FIG. 3 may be performed by another device or a group of devices separate from or including the device, such as a stereo camera (e.g., stereo camera 155), a wireless communication component (e.g., wireless communication component 160), a satellite device (e.g., satellite device 170), one or more computing devices (e.g., one or more computing devices 175), and/or a base station (e.g., base station 180).

As shown in FIG. 3, process 300 may include receiving, from one or more sensor devices of the work machine, sensor data of an environment that includes a ground surface on which the work machine is located (block 310). For example, the controller may receive, from one or more sensor devices of the work machine, sensor data of an environment that includes a ground surface on which the work machine is located, as described above.

The one or more sensor devices are one or more first sensor devices and the sensor data is first sensor data, wherein the method further comprises receiving, from one or more second sensor devices, second sensor data regarding at least one of a position or an orientation of one or more portions of the work machine.

As further shown in FIG. 3, process 300 may include determining whether a wireless connection is viable (block 320). For example, the controller may determine whether a wireless connection is viable, as described above.

Process 300 includes determining whether the work machine is in an idle state or in an active state, or determining whether an implement, of the work machine, is in a locked position or in an unlocked position, and wherein determining whether the wireless connection is viable comprises determining whether the wireless connection is viable when at least one of the work machine is in the active state, or the implement is in the unlocked position.

As further shown in FIG. 3, process 300 may include selectively transmitting the sensor data to one or more computing devices for processing or processing the sensor data locally by the work machine based on whether the wireless connection is viable (block 330).

For example, the controller may selectively transmit the sensor data to one or more remote computing devices for processing or processing the sensor data locally by the work machine based on whether the wireless connection is viable, wherein, when the wireless connection is viable, the sensor data is transmitted to the one or more remote computing devices to cause the one or more remote computing devices to process the sensor data to provide first processed data, wherein the first processed data includes at least one of first surface data regarding one or more portions of the ground surface or first volume data regarding a volume of material moved or to be moved by the work machine, wherein, when the wireless connection is not viable, the sensor data is processed locally by the work machine to generate second processed data, wherein the second processed data includes at least one of second surface data regarding the one or more portions of the ground surface or second volume data regarding the volume of material moved or to be moved by the work machine, as described above.

Transmitting the sensor data comprises transmitting one or more of one or more images of the environment, one or more disparity maps of the environment, and/or one or more point clouds of the environment.

Transmitting the sensor data comprises transmitting the sensor data to the one or more computing devices for processing via a satellite device configured for high-speed communication, or a cellular network configured for high-speed communication.

Transmitting the sensor data comprises transmitting the sensor data to cause the one or more remote computing devices to perform filtering operations on the sensor data, wherein the filtering operations include two or more of removing noise from the sensor data, removing image occlusion from the sensor data, or removing, from the sensor data, information regarding one or more obstructions in the environment.

Transmitting the sensor data comprises transmitting the sensor data and processing information to cause the one or more remote computing devices to process the sensor data, based on the processing information, to generate the processed data. The processing information includes at least one of: information identifying a manner for filtering the sensor data to obtain filtered sensor data, or information identifying one or more machine learning models for processing the sensor data or the filtered sensor data to generate the processed data.

As further shown in FIG. 3, process 300 may include providing the first processed data or the second processed data to facilitate an operation of the work machine (block 340). For example, the controller may provide the first processed data or the second processed data to facilitate an operation of the work machine, as described above.

The first volume data or the second volume data includes at least one of information identifying a first volume of material in a bucket of an implement of the work machine, or information identifying a second volume of material located at the one or more portions of the ground surface, and wherein providing the first processed data or the second processed data comprises providing the at least one of the information identifying the first volume or the information identifying the second volume.

The first surface data or the second surface data includes at least one of information identifying one or more pits located at the one or more portions of the ground surface, or information identifying one or more piles of material located at the one or more portions of the ground surface, and wherein providing the first processed data or the second processed data comprises providing the at least one of the information identifying the one or more pits or the information identifying the one or more piles to facilitate at least one of a movement of the work machine on the ground surface, or an operation of an implement of the work machine.

The one or more sensor devices are one or more first sensor devices and the sensor data is first sensor data, wherein the method further comprises selectively transmitting or processing the sensor data comprises selectively transmitting or processing the first sensor data and the second sensor data to obtain the first processed data or the second processed data, respectively.

Process 300 may include determining that the wireless communication component is unable to receive the processed data after transmitting the sensor data; and preventing the work machine from performing an operation that is based on the processed data when the wireless communication component is unable to receive the processed data after transmitting the sensor data.

Process 300 may include causing the machine to autonomously navigate the ground surface based on the surface data regarding the one or more portions of the ground surface, or causing the machine to autonomously operate the implement to move material based on the volume data regarding the volume of material moved or to be moved by the implement.

Although FIG. 3 shows example blocks of process 300, process 300 may include additional blocks, fewer blocks, different blocks, or differently arranged blocks than those depicted in FIG. 3. Additionally, or alternatively, two or more of the blocks of process 300 may be performed in parallel or combined.

INDUSTRIAL APPLICABILITY

The present disclosure is directed to a machine selectively transmitting sensor data (e.g., from a stereo camera) to one or more remote computing devices for processing or processing the sensor data locally based on whether a wireless connection is viable. For example, the sensor data may be transmitted to the one or more remote computing devices for processing to generate processed data when the wireless connection is viable. Alternatively, when the wireless connection is not viable, the sensor data may be processed locally on the machine.

Processing images from a stereo camera to generate useful information for the machine is a computationally complex and time-consuming task that benefits from using high-performance computing resources. Processing the images using typical computing resources of the machine present several issues. For example, typical computing resources of the machine may process the images to generate information of reduced accuracy and/or reduced quality with respect to the information generated by high-performance computer resources. Processing the images, using the typical computing resources, of the work machine, consumes an excessive amount of computing resources. Such computing resources may be needed for different operations of the work machine. Accordingly, processing the images using the typical computing resources may negatively impact an ability of the work machine to the different operations. Moreover, the work machine may be used in rugged and harsh conditions that may subject the typical computing resources to premature failures. Additionally, the typical computing resources, of the machine, may generate the information in an inefficient manner.

The present disclosure resolves the issues mentioned above. For example, by transmitting the sensor data to the one or more remote computing devices for processing, the processed data of the present disclosure provides an improvement of accuracy and quality with respect to data generated using the typical computing resources of the machine. In this regard, the processed data may improve an accuracy of an operation performed by the machine, may improve a precision of the operation performed by the machine, may improve a speed of the operation performed by the machine, and/or may improve an efficiency of the operation performed by the machine, among other examples. Additionally, by transmitting the sensor data to the one or more remote computing devices for processing, the processed data is generated in an efficient manner. Furthermore, by using a satellite device configured for high-speed communication or a cellular network configured for high-speed communication to communicate with the one or more computing devices, the machine may receive the processed data in a timely manner.

Moreover, the one or more computing devices are not subject to the rugged and harsh conditions common at many jobsites, and, accordingly, are not subject to premature failures. Additionally, by transmitting the sensor data to the one or more remote computing devices for processing the machine preserves its computing resources that would have otherwise been consumed by locally processing the images. Moreover, by transmitting the sensor data to the one or more remote computing devices for processing, the machine reduces power consumption and, accordingly, preserves the excessive amount of power that would have otherwise been consumed by the typical computing resources when processing the images. Additionally, using the one or more remote computing devices for processing provides flexibility with respect to equipment upgrade of the machine.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Additionally, the term "remove", as used herein, encompasses the partial reduction of a property or characteristic, as well as the elimination of that property or characteristic.

What is claimed is:

1. A method performed by a controller of a work machine, the method comprising:
   receiving, from one or more sensor devices of the work machine, sensor data of an environment that includes a ground surface on which the work machine is located;
   determining whether a wireless connection is viable;
   selectively transmitting the sensor data to one or more remote computing devices for processing or processing the sensor data locally by the work machine, based on the determining whether the wireless connection is viable,
      wherein, when the wireless connection is viable, the sensor data is transmitted to the one or more remote computing devices to cause the one or more remote computing devices to process the sensor data to provide first processed data, wherein the first processed data includes at least one of first surface data regarding one or more portions of the ground surface or first volume data regarding a volume of material moved or to be moved by the work machine,
      wherein, when the wireless connection is not viable, the sensor data is processed locally by the work machine to generate second processed data, wherein the second processed data includes at least one of second surface data regarding the one or more portions of the ground surface or second volume data regarding the volume of material moved or to be moved by the work machine;
      wherein the first volume data or the second volume data includes at least one of:
         information identifying a first volume of material in an implement of the work machine, or
         information identifying a second volume of material located at the one or more portions of the ground surface, or
            wherein providing the first processed data or the second processed data comprises:
               providing the at least one of the information identifying the first volume or the information identifying the second volume; and
   providing the first processed data or the second processed data to facilitate an operation of the work machine.

2. The method of claim 1, wherein transmitting the sensor data comprises:
   transmitting one or more of:
      one or more images of the environment,
      one or more disparity maps of the environment, or
      one or more point clouds of the environment.

3. The method of claim 1, wherein the one or more sensor devices are one or more first sensor devices and the sensor data is first sensor data;
   wherein the method further comprises:
      receiving, from one or more second sensor devices, second sensor data regarding at least one of a position or an orientation of one or more portions of the work machine; and
   wherein selectively transmitting or processing the sensor data comprises:
      selectively transmitting or processing the first sensor data and the second sensor data to obtain the first processed data or the second processed data, respectively.

4. The method of claim 1, wherein transmitting the sensor data comprises:
   transmitting the sensor data to the one or more remote computing devices for processing via:
      a satellite device configured for high-speed communication, or
      a cellular network configured for high-speed communication.

5. The method of claim 1, wherein the second volume data includes:
   information identifying a third volume of material loaded in front of the implement.

6. The method of claim 1, wherein the first surface data or the second surface data includes at least one of:
   information identifying one or more pits located at the one or more portions of the ground surface, or
   information identifying one or more piles of material located at the one or more portions of the ground surface; and
   wherein providing the first processed data or the second processed data comprises:
   providing the at least one of the information identifying the one or more pits or the information identifying the one or more piles to facilitate at least one of:
      a movement of the work machine on the ground surface, or
      an operation of an implement of the work machine.

7. The method of claim 1, wherein transmitting the sensor data comprises:
   transmitting the sensor data to cause the one or more remote computing devices to perform filtering operations on the sensor data,
      wherein the filtering operations include two or more of:
         removing noise from the sensor data, or
         removing image occlusion from the sensor data.

8. The method of claim 1, further comprising:
   determining whether the work machine is in an idle state for a threshold amount of time or in an active state; or
   determining whether an implement of the work machine is in a locked position or in an unlocked position; and
   wherein determining whether the wireless connection is viable comprises:

determining whether the wireless connection is viable when at least one of:
the work machine is in the active state, or
the implement is in the unlocked position.

9. A system comprising:
one or more sensor devices configured to obtain sensor data of an environment that includes a ground surface on which a work machine is located; and
a controller configured to:
determine whether a wireless connection is viable;
transmit, using a wireless communication component, the sensor data to one or more remote computing devices for processing when the wireless connection is viable,
wherein the sensor data is transmitted to the one or more remote computing devices to cause the one or more remote computing devices to filter the sensor data and generate processed data;
receive, from the one or more remote computing devices, the processed data,
wherein the processed data includes at least one of surface data regarding one or more portions of the ground surface or volume data regarding a volume of material moved or to be moved by the work machine;
wherein the surface data includes at least one of:
information identifying one or more pits located at the one or more portions of the ground surface, or
information identifying one or more piles of material located at the one or more portions of the ground surface; and
wherein providing the processed data comprises:
providing the at least one of the information identifying the one or more pits or the information identifying the one or more piles to facilitate
an operation of the work machine.

10. The system of claim 9, wherein the one or more sensor devices include at least one of:
one or more stereo cameras, or
one or more light detection and ranging (LIDAR) devices; and
wherein the one or more remote computing devices include:
one or more cloud computing devices.

11. The system of claim 9, wherein the controller, to provide the processed data, is configured to provide the volume data to facilitate a material moving operation; and
wherein the volume data includes at least one of:
information identifying a first volume of material in an implement of the work machine,
information identifying a second volume of material located at the one or more portions of the ground surface, or
information identifying a volume of material moved by the work machine over a period of time.

12. The system of claim 9, wherein the controller, to transmit the sensor data, is configured to:
transmit, to the one or more remote computing devices, the sensor data and processing information to cause the one or more remote computing devices to process the sensor data, based on the processing information, to generate the processed data,
wherein the processing information includes at least one of:
information identifying a manner for filtering the sensor data to obtain filtered sensor data, or
information identifying one or more machine learning models for processing the sensor data or the filtered sensor data to generate the processed data.

13. The system of claim 9, wherein the controller is configured to:
determine that the wireless connection is not viable;
cause the sensor data to be stored for a threshold amount of time based on determining that the wireless connection is not viable; and
determine whether the wireless connection is viable after the threshold amount of time;
wherein the controller, to transmit the sensor data to the one or more computing devices, is configured to:
cause the sensor data to be transmitted to the one or more remote computing devices based on determining that the wireless connection is viable after the threshold amount of time.

14. The system of claim 9, wherein the processed data is first processed data, the surface data is first surface data, and the volume data is first volume data; and
wherein the controller is configured to:
determine that the wireless connection is not viable;
process the sensor data locally to generate second processed data based on determining that the wireless connection is not viable,
wherein the second processed data includes at least one of second surface data regarding the one or more portions of the ground surface or second volume data regarding the volume of material moved or to be moved by the work machine; and
provide the second processed data to facilitate an operation of the work machine.

15. The system of claim 9, wherein the controller is configured to:
determine that the wireless communication component is unable to receive the processed data after transmitting the sensor data; and
prevent the work machine from performing an operation that is based on the processed data when the wireless communication component is unable to receive the processed data after transmitting the sensor data.

16. A machine comprising:
an implement;
one or more sensor devices configured to obtain sensor data of an environment that includes a ground surface on which the machine is located;
a wireless communication component; and
a controller configured to:
determine whether a wireless connection is viable;
transmit, using the wireless communication component, a request to one or more remote computing devices based on determining that the wireless connection is viable,
wherein the request, including the sensor data, is transmitted to the one or more remote computing devices to cause the one or more remote computing devices to filter the sensor data and generate processed data after filtering the sensor data;
receive, from the one or more remote computing devices, the processed data,
wherein the processed data includes at least one of surface data regarding one or more portions of the ground surface or volume data regarding a volume of material moved or to be moved by the implement;
wherein the surface data includes at least one of:

information identifying one or more pits, or one or more piles located at the one or more portions of the ground surface;
information identifying one or more pits, or one or more piles located at the one or more portions of the ground surface;
wherein the volume data includes at least one of:
a first volume of material in an implement of the work machine, a second volume of material located at the one or more portions of the ground surface, or a third volume of material loaded in front of the implement; and
provide the processed data to facilitate at least one of:
a movement of the machine in the environment, or
an operation of the implement of the machine.

17. The machine of claim 16, wherein the controller, to provide the processed data, is configured to:
provide the surface data; and
wherein the surface data further includes one or more of:
information identifying a shape of one or more pits located at the one or more portions of the ground surface,
information identifying a shape of one or more piles of material located at the one or more portions of the ground surface, or
information identifying a map of the ground surface.

18. The machine of claim 16, wherein the controller, to transmit the request to cause the one or more computing devices to filter the sensor data, is configured to:
transmit the sensor data to cause the one or more remote computing devices to:
remove noise from the sensor data,
remove image occlusion from the sensor data, or
remove, from the sensor data, information regarding one or more obstructions in the environment.

19. The machine of claim 16, wherein the controller is further configured to:
cause the machine to autonomously navigate the ground surface based on the surface data regarding the one or more portions of the ground surface, or
cause the machine to autonomously operate the implement to move material based on the volume data regarding the volume of material moved or to be moved by the implement.

20. The machine of claim 16, wherein the controller, to transmit the sensor data, is configured to:
selectively transmit the sensor data to the one or more remote computing devices for processing via a satellite device configured for high-speed communication or via a cellular network configured for high-speed communication.

* * * * *